Jan. 27, 1970  D. K. GORDON ET AL  3,492,553
MULTISPEED DRIVE SYSTEM FOR A CHART RECORDER
Filed July 11, 1967  3 Sheets-Sheet 1

INVENTORS
Delbert K. Gordon
Wayne J. Kooy
BY
Richard E. Bee
ATTORNEY

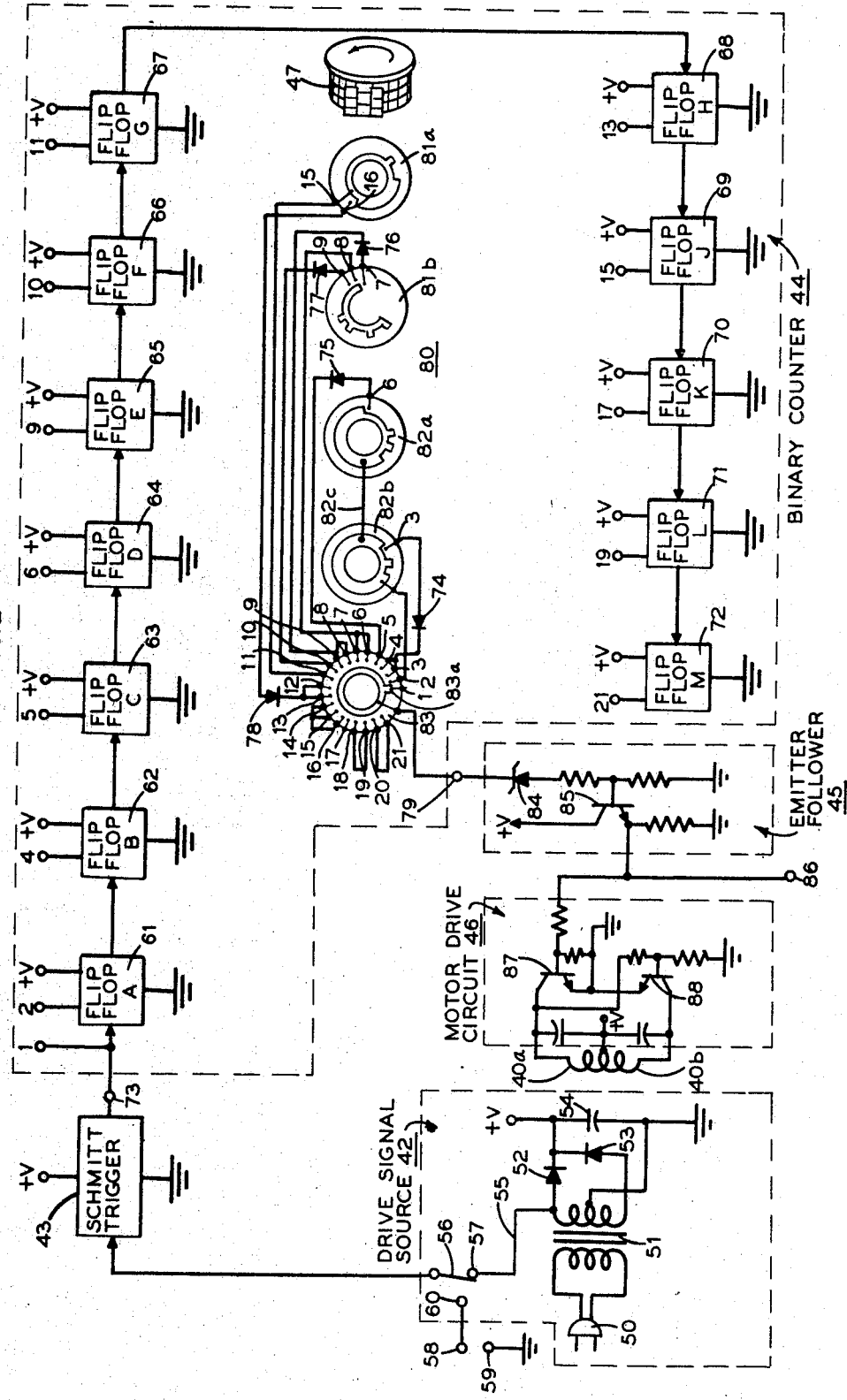

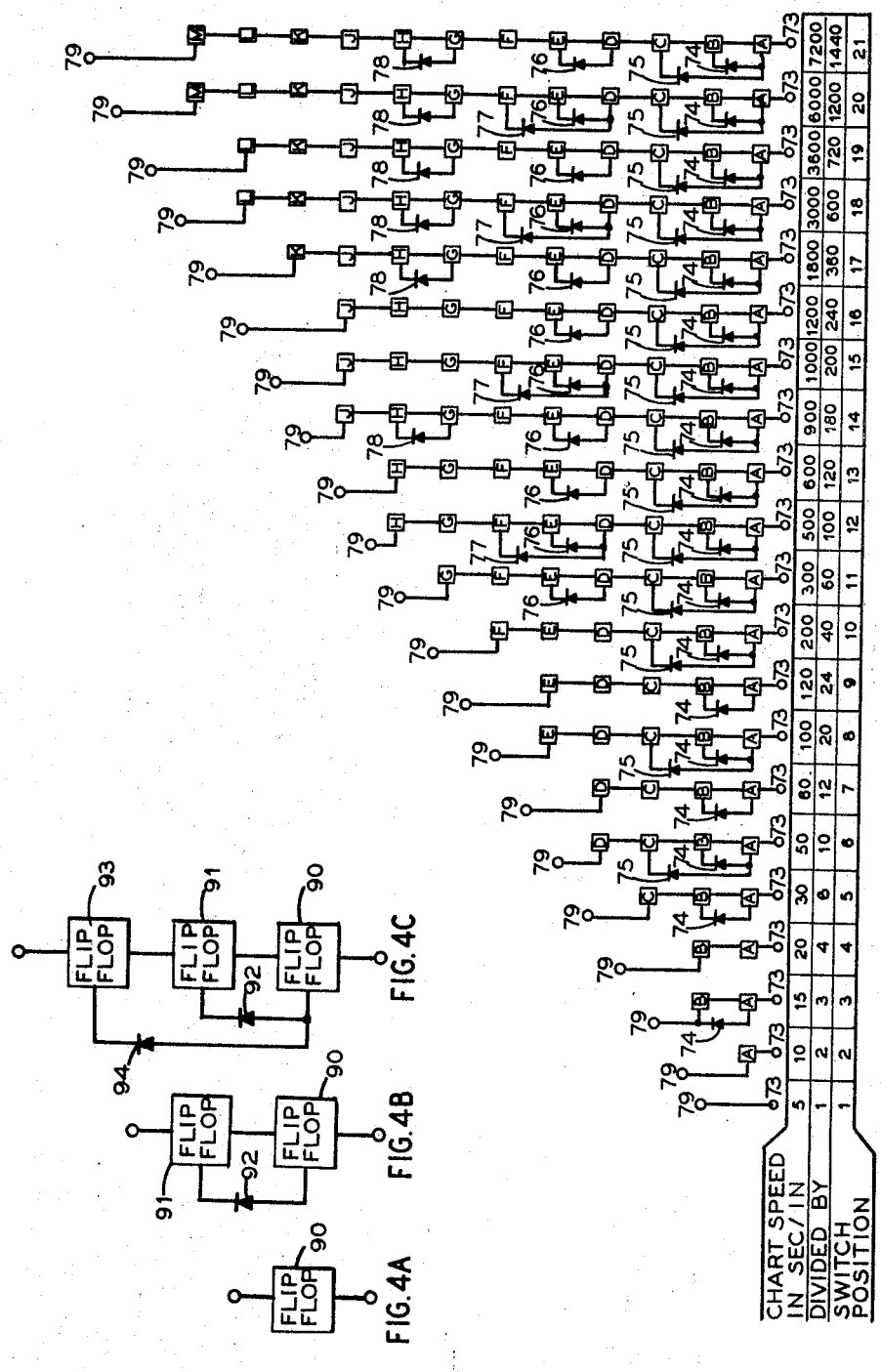

United States Patent Office 3,492,553
Patented Jan. 27, 1970

1

3,492,553
MULTISPEED DRIVE SYSTEM FOR A CHART RECORDER
Delbert K. Gordon, St. Joseph, and Wayne J. Kooy, Galien, Mich., assignors to Heath Company, St. Joseph, Mich., a corporation of Delaware
Filed July 11, 1967, Ser. No. 652,582
Int. Cl. H02k *37/00, 29/04*
U.S. Cl. 318—138                                                     3 Claims

ABSTRACT OF THE DISCLOSURE

A multispeed drive system for a chart recorder, The particular embodiment described herein as illustrative of one form of the invention utilizes a stepping motor for advancing the recording chart in discrete steps. The stepping motor is energized by a periodic signal obtained from a binary counter. The binary counter is, in turn, driven by a signal derived from a 60 cycle per second alternating-current power line. The binary counter includes switch means for selectively adjusting the count-down ratio of the counter thereby to selectively drive the stepping motor at different speeds.

---

This invention relates to chart recorders and, particularly, to chart recorders wherein the recording chart can be moved or advanced at different speeds.

In the past, when it has been desired to change the speed of movement of the recording chart past the recording pen, it has been necessary to change the gearing between the chart drive motor and the chart drive roller mechanism. This has sometimes been done by replacement of mechanical linkage gears. This, however, is usually a slow and cumbersome thing to do. In other cases, adjustable mechanical transmission systems have been used to accomplish this purpose. Such systems are, however, relatively expensive and tend to allow only a small number or limited range of speed adjustments to be made.

It is an object of the invention, therefore, to provide a new and improved multispeed drive system for a chart recorder which substantially avoids one or more of the foregoing limitations of previously known recorder drive systems.

It is another object of the invention to provide a new and improved multispeed drive system for a chart recorder wherein any one of a relatively large number of different chart speeds may be selected by means of fast acting electrical circuits which are readily and easily adjusted to provide the desired speed.

It is a further object of the invention to provide a new and improved multispeed drive system for a chart recorder wherein a large number of different operating speeds are provided, each such speed being provided with a relatively high degree of stability and accuracy.

In accordance with the invention, a multispeed drive system for a chart recorder comprises a stepping motor for advancing the recording chart in discrete steps. It further includes motor drive circuit means coupled to the stepping motor for energizing such motor. It also includes circuit means for supplying a drive signal. It further includes a binary counter responsive to the drive signal for supplying a drive signal of lower frequency to the motor drive circuit means. This binary counter includes means for selectively adjusting the count-down ratio of the binary counter thereby to selectively drive the stepping motor at different speeds.

For a better understanding of the present invention, together with other and further objects thereof, reference is had to the following description taken in connection with the accompanying drawings, the scope of the invention being pointed out in the appended claims.

2

Figure 1:
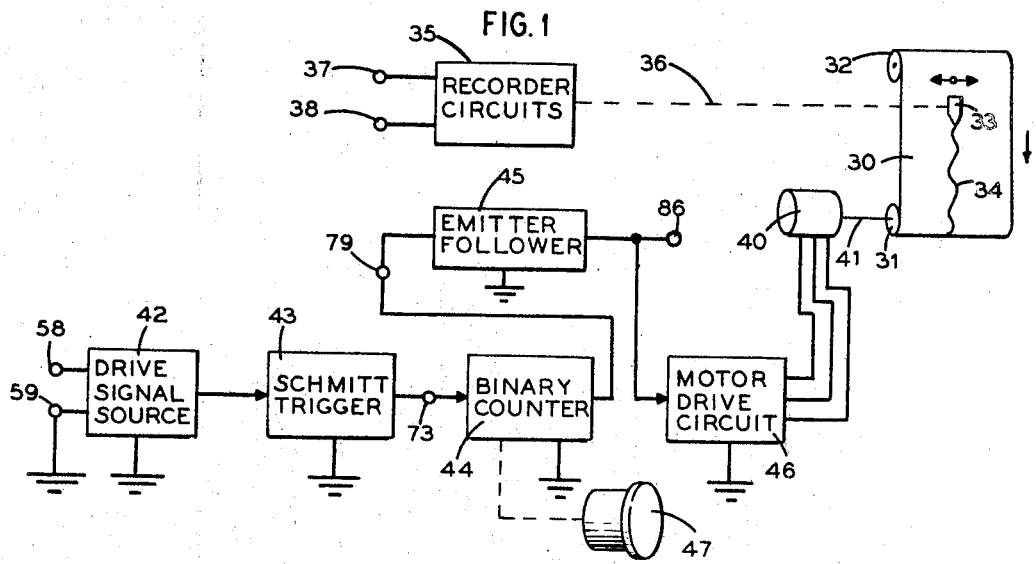
Figure 5:
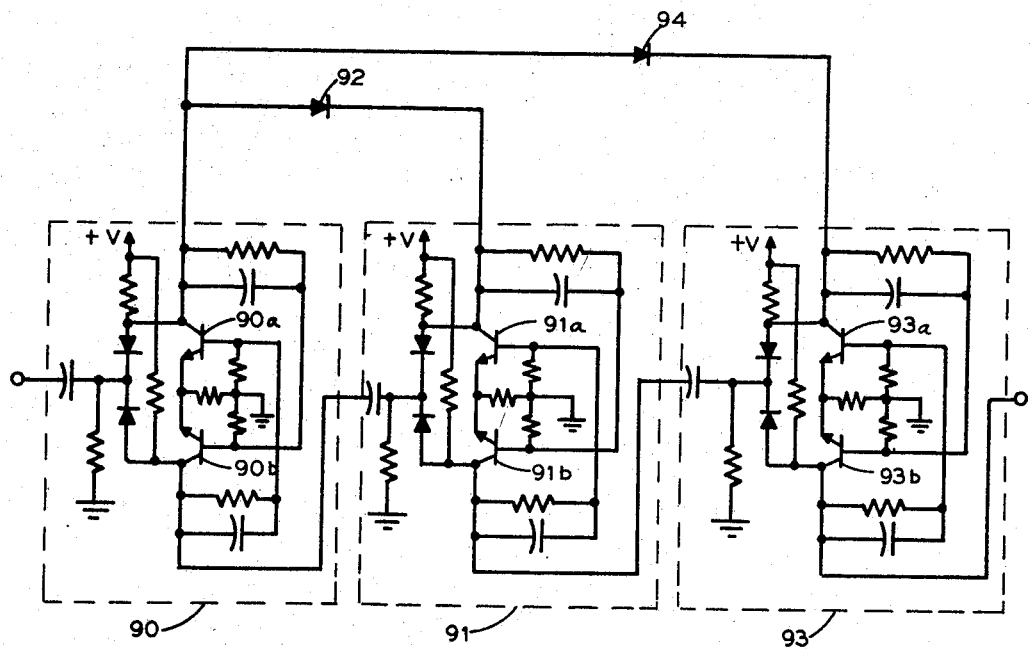

Referring to the drawings:
FIG. 1 is a block diagram of a chart recorder including a multispeed drive system constructed in accordance with the present invention;
FIG. 2 is a more detailed circuit diagram for the multispeed drive system of FIG. 1;
FIG. 3 is a series of block diagrams used in explaining the operation of the FIG 2 binary counter;
FIGS. 4A, 4B and 4C are block diagrams illustrating different possible combinations of bistable circuits contained in the binary counter; and
FIG. 5 is a detailed circuit diagram of the bistable circuit combination shown in FIG. 4C.

Referring to FIGURE 1, there is shown a chart recorder including a multispeed chart drive system. The recorder includes a recording chart 30 spooled between a pair of roller members 31 and 32. A recording pen 33 is positioned in contact with the chart paper 30, so as to trace an ink line 34 thereon as the chart paper 30 moves past the pen 33. Horizontal or lateral movement of the recording pen 33 is controlled by recorder circuits 35 which are coupled to the pen 33 by way of a mechanical linkage represented by dash line 36. The measurement signal to be recorded is supplied to input terminals 37 and 38 of the recorder circuits 35.

The chart paper 30 is advanced in discrete steps in the vertical or longitudinal direction by means of a stepping motor 40 which is coupled to the roller member 31 by way of a mechanical linkage system represented by dash line 41. The linkage system 41 is such that the chart paper 30 moves a vertical distance of one inch every time the stepping motor 40 advances such chart paper by 600 steps. Thus, ink line 34 will appear to be continuous in nature.

Electrical signals for causing the stepping motor 40 to step are supplied to the electrical windings of such motor by means of the following circuits which are coupled in cascade: drive signal source 42, Schmitt trigger 43, binary counter 44, emitter follower 45 and motor drive circuit 46. Source 42 provides an initial drive signal which, in one mode of operation, is a 60 cycle per second sine wave. This 60 cycle sine wave is then shaped into a square wave by means of the Schmitt trigger 43 which performs a signal shaping function. Negative-going transitions in the resulting square wave signal are then counted by the binary counter 44. Since the counter 44 is being used as a frequency divider, the pulse type signal appearing at the output thereof is of a lower frequency than the initial drive signal from source 42. Adjustment of the count-down ratio of the counter 44 is provided by a control knob 47 which is mechanically coupled to adjustable switch means located inside of the counter 44. The resulting lower frequency signal from the counter 44 is supplied by way of emitter follower 45 to the motor drive circuit 46. In response to such signal, motor drive circuit 46 operates to step the motor 40 one step each time the lower frequency drive signal reverses polarity. Thus, the stepping rate of the motor 40 can be adjusted by changing the count-down ratio of the binary counter 44 by means of the control knob 47.

Referring now to FIGURE 2 of the drawings, there is shown a more detailed circuit diagram of the chart drive circuits. As there seen, the drive signal source 42 takes the form of a power supply circuit having a power line plug 50 which is adapted to be coupled to a 60 cycle per second alternating-current power line. This plug is connected by way of a power transformer 51 to a full wave rectifier circuit formed by diodes 52 and 53 and condenser 54. A direct-current voltage of +V volts is developed across the condenser 54. This +V voltage is used as the power supply voltage for the remainder of the circuits.

The initial 60 cycle per second drive signal is developed by means of a connection 55 running from one side of the power transformer secondary winding, through a switch 56 and to the Schmitt trigger 43. With switch 56 in the position shown (in contact with terminal 57), the system in driven by its own internally developed signal, namely, the signal appearing at one side of the power transformer secondary winding. The system can also be driven by means of an external signal which is coupled to external supply terminals 58 and 59. This is done by setting switch 56 so that it contacts the terminal 60.

The binary counter 44 includes a plurality of bistable circuits 61–72 coupled in cascade with one another. Each bistable circuit takes the form of a flip-flop circuit. The counting input of the initial bistable circuit or flip-flop circuit 61 is connected to the output of the Schmitt trigger 43, a terminal 73 representing the input terminal for the counter 44 as a whole. The counter 44 also includes a plurality of diodes 74–78 which will be referred to as feedback diodes since their function is to provide feedback paths between different ones of the flip-flop circuits.

The binary counter 44 further includes adjustable switch means coupled to the bistable circuits 61–72 and the feedback diodes 74–78 for selectively coupling different feedback diodes in feedback relation between different bistable circuits and for selectively coupling the outputs of different bistable circuits to an output terminal 79 of the binary counter 44. This switch means is formed by a mechanically-ganged multiposition, multiwafer switch 80. A first wafer has a front side 81a and a back side 81b. A second wafer has a front side 82a and a back side 82b. The metallic conductive layers on the front and back sides 82a and 82b of this wafer are electrically connected together as indicated schematically by conductor 82c. Actually, this would be done by way of a feed-through connection passing from one side of the wafer to the other. Switch 80 also includes a third wafer 83, only one side of which is used. Each of these wafers is mounted on a common mechanical shaft (not shown), the external control knob 47 also being mounted on this same shaft.

For simplicity of illustration, various conductors running between output terminals of the various flip-flop circuits 61–72 and the various lugs on the switch wafer 83 have been omitted. Instead, the various output terminals associated with the flip-flop circuits have been designated by reference numerals 1–21 (some numerals not being used). Similarly, the various lugs on the switch wafer 83 have been designated by reference numerals 1–21. This means that each flip-flop output terminal is connected to the correspondingly designated lug on the switch wafer 83. Thus, for example, output terminal 2 of flip-flop 61 is electrically connected to lug 2 on wafer switch 83.

The output rectangular wave signal appearing at the output terminal 79 of binary counter 44 is supplied by way of a Zener diode 84 to a transistor 85 in the emitter follower circuit 45. Zener diode 84 is a direct-current level adjuster that controls the bias voltage on the base electrode of transistor 85. The reproduced rectangular wave signal appearing at the emitter elecrode of transistor 85 is supplied to the motor drive circuit 46. It is also supplied to an output terminal 86 for providing an external output signal which may be used to synchronize other electrical apparatus, such as another chart recorder.

Motor drive circuit 46 includes a pair of transistors 87 and 88, the collector electrodes of which are connected to motor windings 40a and 40b located inside of the stepping motor 40. The midpoint between windings 40a and 40b is connected to the direct-current power supply terminal +V. The operation of the motor drive circuit 46 is such that the transistor 88 is conductive and the transistor 87 is nonconductive when the signal from emitter follower 45 is at the zero voltage level. When the signal from emitter follower 45 goes to its high level, the transistor 87 becomes conductive and the transistor 88 turns off. When transistor 87 conducts, it draws current through one-half of the motor winding and causes the motor to step, or turn. As transistor 87 cuts off and transistor 88 starts to conduct, the current flows through the other half of the motor winding and causes the motor to step again. Each time the signal from emitter follower 45 changes from a high level to a low level or vice versa the resulting change in current flow through the motor windings 40a and 40b causes the rotor of the motor 40 to step or advance through a discrete angular increment, thus advancing the chart paper 30 one step.

FIGURE 3 is a chart showing the different flip-flop circuit and feedback diode combinations that occur between the input terminal 73 and the output terminal 79 of the binary counter 44 for different positions of the control knob 47. These control knob positions or switch positions are defined in terms of the lugs on the switch wafer 83. Thus, switch position 1 represents the case where the conductive projection 83a is in contact with the contact element for lug 1 on switch wafer 83. In this case, as indicated in FIG. 3, a direct connection is provided between the input terminal 73 and the output terminal 79. When switch 80 is in position 2, the flip-flop 61 (flip-flop A) is connected between the input terminal 73 and the output terminal 79. When switch 80 is in position 3, flip-flops 61 and 62 are connected in cascade between the input terminal 73 and the output terminal 79, the feedback diode 74 in this case being connected between the terminals 4 and 2 of flip-flops 62 and 61, respectively. In a similar fashion, the other combinations depicted in FIG. 3 are established for the other switch positions. The chart speeds given in FIG. 3 are for the case where the signal supplied to the input of the Schmitt trigger 43 has a frequency of 60 cycles per second.

FIGURE 4A shows the flip-flop combination required to produce a 2:1 count-down ratio. In this case, a single flip-flop 90 is used. FIGURE 4B shows the combination that is used to provide a 3:1 count-down ratio. In this case, a pair of flip-flops 90 and 91 and a feedback diode 92 are used. FIGURE 4C shows the combination that is required to provide a 5:1 count-down ratio. In this case, three flip-flops 90, 91 and 93 are required as are a pair of feedback diodes 92 and 94. By observing the occurrence of the different combinations indicated in FIGS. 4A, 4B and 4C in FIG. 3, it can be determined how the over-all count-down ratio is provided for any given switch position.

FIGURE 5 shows a detailed circuit diagram for the 5:1 count-down ratio combination of FIG. 4C. As indicated in FIG. 5, each of the bistable circuits or flip-flop circuits 90, 91 and 93 includes first and second transistors. Thus, flip-flop 90 includes a first transistor 90a and a second transistor 90b. Similarly, flip-flop 91 includes a first transistor 91a and a second transistor 91b. Likewise, flip-flop 93 includes a first transistor 93a and a second transistor 93b. The signal appearing at the collector of transistor 90b is used to drive the second flip-flop 91, while the signal appearing at the collector of transistor 91b is used to drive the third flip-flop 93. The first feedback diode 92 is connected between the collector of transistor 91a and the collector of transistor 90a. The second feedback diode 94 is connected between the collector of transistor 93a and the collector of transistor 90a.

In operation, only one transistor in each of the flip-flops will be conductive at any given moment, the other transistor being nonconductive. In the absence of the feedback diodes 92 and 94, the three cascaded flip-flops 90, 91 and 93 would be effective to provide an 8:1 count-down ratio. The first feedback diode 92 operates to eliminate one of the eight possible binary counting combinations by feeding back a reset pulse to the first flip-flop 90 each time a transition of a particular polarity occurs in the second flip-flop 91. This will happen twice, thus eliminating two of the possible binary counting combinations. In a somewhat similar manner, the second feedback diode 94 will eliminate a third of the eight possible binary counting combinations by feeding back a reset pulse to the first flip-flop 90 upon the occurrence of a transition of a particular polarity in the third flip-flop 93. Thus, there is provided a 5:1 count-down ratio instead of an 8:1 count-down ratio.

As is seen from the foregoing description, the chart drive system of the present embodiment provides 21 different driving speeds or stepping rates for the stepping motor 40 which drives the chart paper 30. These are readily and easily selected by the simple expedient of turning the control knob 47. These 21 driving speeds are quite stable and quite accurate because each is accurately synchronized with the 60 cycle per second power line frequency. In other words, the 60 cycle power line frequency controls the operation in each case so that the speed is as accurate and as stable as the 60 cycle line frequency.

While there has been described what is at present considered to be a preferred embodiment of this invention, it will be obvious to those skilled in the art that various changes and modifications may be made therein without departing from the invention, and it is, therefore, intended to cover all such changes and modifications as fall within the true spirit and scope of the invention.

What is claimed is:

1. A multispeed drive system for a chart recorder comprising:
   a stepping motor for advancing the recording chart in discrete steps;
   motor drive circuit means coupled to the stepping motor for energizing such motor;
   a plurality of bistable circuits coupled in cascade;
   circuit means for supplying a drive signal to the initial bistable circuit;
   a plurality of diodes;
   and adjustable switch means coupled to the bistable circuits, the diodes and the motor drive circuit means for selectively coupling different diodes in feedback relation between different bistable circuits and for selectively coupling the outputs of different bistable circuits to the motor drive circuit means thereby to selectively drive the stepping motor at different speeds.

2. A multispeed drive system for a chart recorder comprising:
   a stepping motor for advancing the recording chart in discrete steps;
   motor drive circuit means coupled to the stepping motor for energizing such motor;
   a plurality of bistable circuits coupled in cascade;
   circuit means adapted to be coupled to an alternating-current power line for supplying a periodic drive signal to the initial bistable circuit;
   a plurality of diodes;
   and adjustable switch means coupled to the bistable circuits, the diodes and the motor drive circuit means for selectively coupling different diodes in feedback relation between different bistable circuits and for selectively coupling the outputs of different bistable circuits to the motor drive circuit means thereby to selectively drive the stepping motor at different speeds.

3. A multispeed drive system for a chart recorder comprising:
   a stepping motor for advancing the recording chart in discrete steps;
   motor drive circuit means coupled to the stepping motor for energizing such motor;
   at least two bistable circuits coupled in cascade;
   circuit means for supplying a drive signal of predetermined frequency to the initial bistable circuit;
   a diode;
   and adjustable switch means coupled to the bistable circuits, the diode and the motor drive circuit means for selectively coupling the output of the initial bistable circuit to the motor drive circuit means for driving the stepping motor at a first speed, for selectively coupling the diode in feedback relation between the initial and the second bistable circuit and the output of the second bistable circuit to the motor drive circuit means for driving the stepping motor at a second speed, and for selectively disconnecting the diode and coupling the output of the second bistable circuit to the motor drive circuit means for driving the stepping motor at a third speed.

References Cited

UNITED STATES PATENTS

| | | | |
|---|---|---|---|
| 3,011,127 | 11/1961 | Thatte | 328—48 |
| 3,060,328 | 10/1962 | McMillian | 328—49 |
| 3,172,042 | 3/1965 | Dawirs | 328—48 |
| 3,202,837 | 8/1965 | Baracket | 328—48 |
| 3,241,017 | 3/1966 | Madsen, et al. | 310—49 |
| 3,281,630 | 10/1966 | Liang | 318—138 |
| 3,342,932 | 9/1967 | Bounsall | 328—46 |
| 3,373,329 | 3/1968 | Kaiser | 318—341 |

ORIS L. RADER, Primary Examiner

L. L. HEWITT, Assistant Examiner

U.S. Cl. X.R.

307—225; 318—341; 328—42, 48